(12) United States Patent
Xu

(10) Patent No.: US 8,751,670 B2
(45) Date of Patent: Jun. 10, 2014

(54) METHODS AND DEVICES FOR PROVIDING INTERNET ACCESS THROUGH A RESTRICTED DEVICE

(75) Inventor: Chuyue Xu, Fairfax, VA (US)

(73) Assignee: Chuyue Xu

( * ) Notice: Subject to any disclaimer, the term of this patent is extended or adjusted under 35 U.S.C. 154(b) by 356 days.

(21) Appl. No.: 13/187,082

(22) Filed: Jul. 20, 2011

(65) Prior Publication Data

US 2012/0023243 A1 Jan. 26, 2012

Related U.S. Application Data

(60) Provisional application No. 61/366,213, filed on Jul. 21, 2010.

(51) Int. Cl.
*G06F 15/16* (2006.01)

(52) U.S. Cl.
USPC ............................ 709/228; 709/227; 370/401

(58) Field of Classification Search
CPC ....................................................... H04L 69/16
USPC .......... 709/227–228, 236–237; 370/352–356, 370/389, 401
See application file for complete search history.

(56) References Cited

U.S. PATENT DOCUMENTS

| | | | | |
|---|---|---|---|---|
| 6,073,172 A | * | 6/2000 | Frailong et al. | 709/227 |
| 7,099,944 B1 | * | 8/2006 | Anschutz et al. | 709/227 |
| 7,145,898 B1 | * | 12/2006 | Elliott | 370/401 |
| 8,094,647 B2 | * | 1/2012 | Elliott et al. | 709/228 |
| 2004/0039822 A1 | * | 2/2004 | Bensimon | 709/227 |
| 2005/0117605 A1 | * | 6/2005 | Yan et al. | 370/401 |
| 2009/0028168 A1 | * | 1/2009 | Somekh et al. | 370/401 |

* cited by examiner

*Primary Examiner* — Bharat N Barot

(57) ABSTRACT

According to an aspect of the disclosure, novel solutions are disclosed for providing Internet access to a client device (e.g., desktop computer, laptop computer, tablet computer or portable electronic device) using non-privileged portions of an application programming interface ("API") of a gateway device (e.g., smartphone or cellular phone). According to another aspect of the disclosure, novel solutions are provided for building a Wireless Internet gateway system through a Wi-Fi capable gateway device that also has Internet access provisioned by a cell phone carrier. A Wi-Fi Internet gateway system can be implemented on a device where it was originally impossible to do so, due to various access restrictions to core functionalities, such as root access restrictions.

14 Claims, 10 Drawing Sheets

METHODS AND DEVICES FOR PROVIDING INTERNET ACCESS THROUGH A RESTRICTED DEVICE

CROSS-REFERENCE TO RELATED APPLICATIONS

This application claims the benefit of U.S. Provisional Patent Application No. 61/366,213, filed on Jul. 21, 2010, the entire disclosure of which is incorporated herein by reference as if set forth in full herein.

BACKGROUND

So-called "smartphone" devices are leading a technological revolution because of their ability to provide voice, data and video communications as well as their ability to provide access to a wide array of applications. However, today's smartphones have their disadvantages because they usually operate using a less sophisticated and sometimes far more restricted operating system (OS) and application programming interface (API) compared with other devices.

As a result, it is not possible to implement or operate a so-called "Internet gateway" on particular restricted smartphones or other restricted devices by using so-called "third-party, gateway applications" because the restricted device denies such third party applications access to the necessary portions of an API, or otherwise prohibits such applications from sending and receiving network frames directly from an OS.

The present inventor realized that solutions were needed to overcome the limitations of restricted devices described above.

SUMMARY

Figure 1:
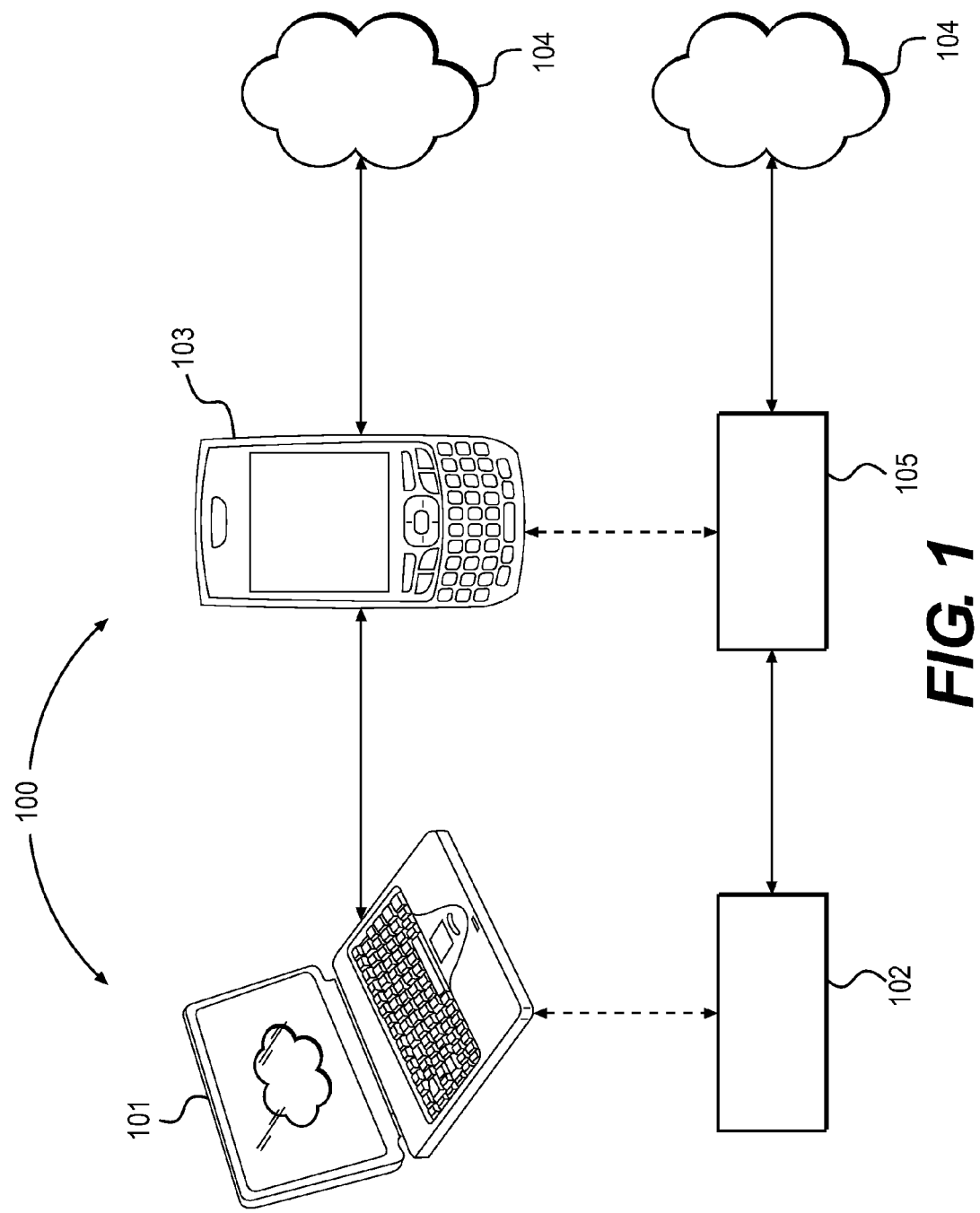
FIG. 1 shows a block diagram of a traditional network including a client device operable to seek access to the Internet via an intermediate, or gateway device.

The present disclosure provides a number of solutions to the problems presented by restrictive operating systems and application programming interfaces ("APIs") in smartphones.

According to an embodiment, a method is provided for providing Internet access to a client device connected to a gateway device that is adapted to establish an Internet connection. The method includes: receiving, at the gateway device, at least one outgoing IP frame generated by a client device; determining a type of the at least one outgoing IP frame using a gateway platform of the gateway device, wherein the gateway platform is adapted to access a network application programming interface of the gateway device that is adapted to create and control TCP/UDP connections; generating, using the gateway platform, at least one invocation in response to receiving the at least one outgoing IP frame; and forwarding, using the gateway platform, the at least one invocation to particular, non-privileged portions of the network application programming interface.

According to a further embodiment, a client gateway platform of the client device is used to intercept IP frames generated by a network application platform and/or an operating system of the client device. The network application platform is adapted to communicate with a client side application programming interface of the client device, and the client side application programming interface is adapted to communicate with the operating system. The method further includes forwarding intercepted IP frames from the client gateway platform to a transceiver section of the client device for transmission to the gateway device.

According to another embodiment, a gateway device is adapted to provide Internet access to a client device seeking Internet access through the gateway device. The gateway device includes: a transceiver adapted to receive at least one outgoing IP frame generated by the client device; a network application programming interface adapted to create and control TCP or UDP connections; and a gateway platform adapted to access the network application programming interface. The gateway platform is further adapted to determine a type of the at least one outgoing IP frame by detecting header information of the at least one outgoing IP frame, generate at least one invocation based on the header information, and forward the at least one invocation to particular, non-privileged portions of the network application programming interface.

According to another embodiment, a programmable storage device or programmable storage medium including a gateway platform is provided. The gateway platform is adapted to access a network application programming interface adapted to create and control TCP or UDP connections of a gateway device, wherein the gateway device is adapted to provide Internet access to a client device seeking Internet access through the gateway device. The gateway platform is adapted to determine a type of the at least one outgoing IP frame generated by the client device, by detecting header information of the at least one outgoing IP frame. The gateway platform is further adapted to generate at least one invocation based on the header information, and forward the at least one invocation to particular, non-privileged portions of the network application programming interface.

According to yet another embodiment, a method is provided for providing Internet access to a client device connected to a gateway device that is adapted to establish an Internet connection. The method includes monitoring network events by using a gateway platform to periodically generate at least one invocation to particular, non-privileged portions of a network application programming interface of the gateway device, wherein the network application programming interface is adapted to create and control TCP or UDP connections. Upon the occurrence of a network event, a notification is received, from the network application programming interface, of the network event and a type of the network event. The method further includes assembling, using the gateway platform, a new IP frame based on the type of the network event, and forwarding the new IP frame from the gateway platform to a transceiver section adapted to transmit the new IP frame to the client device.

According to another embodiment, a gateway device adapted to provide Internet access to a client device seeking Internet access through the gateway device includes: a transceiver section adapted to transmit IP frames to the client device; a network application programming interface adapted to create and control TCP or UDP connections; and a gateway platform. The gateway platform is adapted to monitor network events by periodically generating at least one invocation to particular, non-privileged portions of the network application programming interface. Upon the occurrence of a network event, the gateway platform is adapted to receive a notification, from the network application programming interface, of the network event and a type of the network event. The gateway platform is further adapted to assemble a new IP frame based on the type of the network event, and forward the new IP frame to the transceiver section.

According to another embodiment, a programmable storage device or programmable storage medium including a gateway platform is provided. The gateway platform is adapted to access a network application programming interface that is adapted to create and control TCP or UDP connections of a gateway device, wherein the gateway device is adapted to provide Internet access to a client device seeking Internet access through the gateway device. The gateway platform is further adapted to monitor network events by periodically generating at least one invocation to particular, non-privileged portions of the network application programming interface. Upon the occurrence of a network event, the gateway platform is adapted to receive a notification, from the network application programming interface, of the network event and a type of the network event. The gateway platform is further adapted to assemble a new IP frame based on the type of the network event, and forward the new IP frame to a transceiver section adapted to transmit the new IP frame to the client device.

According to another embodiment, a method of providing Internet access includes: operating a client application platform of a client device to create a Wi-Fi network; enabling a gateway device to join the Wi-Fi network; and operating the client application platform to request Internet access via a Wi-Fi connection to the gateway device.

According to another embodiment, a method of providing Internet access includes: operating a gateway platform of a gateway device to connect to a secondary gateway server that is operable to send IP packets to the Internet, receive IP packets from a client device via a Wi-Fi connection between the gateway device and the client device, and send IP packets received from the client device to the secondary gateway server. The method further includes operating the gateway platform to receive IP packets from the secondary gateway server, and send IP packets received from the secondary gateway server to the client device. The gateway device is adapted to access the Internet through a telephone data service.

According to another embodiment, a gateway device adapted to access the Internet through a telephone data service, and adapted to provide a client device access to the Internet, is provided. The gateway device includes a gateway platform that is operable to: connect to a secondary gateway server that is operable to send IP packets to the Internet; receive IP packets from the client device via a Wi-Fi connection; send IP packets received from the client device to the secondary gateway server; receive IP packets from the secondary gateway server; and send IP packets received from the secondary gateway server to the client device.

According to yet another embodiment, a programmed storage device or programmed storage medium includes a gateway platform for a gateway device that is adapted to access the Internet through a telephone data service and provide a client device access to the Internet. The gateway platform is operable to: connect to a secondary gateway server that is operable to send IP packets to the Internet; receive IP packets from the client device via a Wi-Fi connection; send IP packets received from the client device to the secondary gateway server; receive IP packets from the secondary gateway server; and send IP packets received from the secondary gateway server to the client device.

According to yet another embodiment, a secondary gateway server is provided. The secondary gateway server is operable to accept connections from a gateway platform of a gateway device that is adapted to access the Internet through a telephone data service, wherein the gateway platform is operable to receive outgoing IP packets from a client device via a Wi-Fi connection between the gateway device and the client device. The secondary gateway server is further operable to send the outgoing IP packets to the Internet, and send incoming IP packets from the Internet to the gateway device for forwarding to the client device via the Wi-Fi connection.

Additional features and advantages will be apparent to those skilled in the art from the following detailed description and accompanying drawings.

DETAILED DESCRIPTION, WITH EXAMPLES

The present disclosure provides a number of solutions to problems presented by restricted smartphones and other restricted devices. In general, the following discussion is broken up into two parts. The first part discusses techniques for solving the restricted device dilemma by using non-privileged portions of an application programming interface (API). The second part discusses the design of a Wi-Fi Internet gateway system that presents a DHCP server within a client device, and the use of a secondary server, among other features, to overcome the problems associated with restricted devices. The second part may also make use of some of the ideas set forth in the first part as well.

I. Internet Access Using Non-Privileged Portions of an API

Referring to FIG. 1, there is shown a simplified diagram representing an existing network 100. As shown in FIG. 1, the network 100 includes a client device 101, which is seeking access to the Internet 104. The device 101 may comprise a client application platform 102 that is operable along with other elements of the device 101 to request access to Internet 104 via intermediate device 103, which has access to the Internet 104. The device 103 typically includes an application 105 that may be operable along with other elements of device 103 to provide access to the Internet 104 to the client device 101 (as well as other devices) upon receiving a request to access the Internet 104 from the client device 101. Before going further, it should be understood that examples of a client device 101 may be a laptop or desktop computer, or any other device that requires or is seeking (both terms are used synonymously in this context) access to the Internet 104 (e.g., tablets, portable electronic devices), while examples of the intermediate device 103 may be a smartphone. Further, it should be understood that the Internet 104 may comprise an Internet Service Provider (ISP) or the like.

The client device 101 and intermediate device 103 may be operable to complete two-way communications, for example, through Universal Serial Bus (USB), Bluetooth, Wi-Fi, local area network or via other types of connections.

Typically, two methods may be used by the client device 101 to gain access to the Internet 104 via intermediate device 103. In the first method, device 103 forwards or routes IP frames between the client device 101, and the Internet 104. In this method IP frames are forwarded as a whole, with little or no modification.

To route IP frames, the application 105 may incorporate Network Address Translation (NAT) in order to, among other things, map the public IP address of the device 103 to a private address of the client device 101. Alternatively, a Virtual Private Network (VPN) may be used to forward IP frames as a whole by "encapsulating" and transporting IP frames.

Because the device 103 acts as a "gateway" to the Internet 104 on behalf of the device 101 it may be fittingly referred to as a "gateway device". Similarly, because application 105 within device 103 performs functions that enable the device 105 to act as a gateway, the application 105 may be referred to as a "gateway application". Gateway application 105 may be part of the software system that comes with the gateway device or installed as a third party application.

To be successful in connecting the client device 101 to the Internet 104 using traditional methods the gateway application 105 needs to have access to those elements of device 103 that are responsible for transmitting and receiving IP packets. Typically, this is accomplished by embedding (or otherwise combining) the application 105 in either the OS kernel (not shown in FIG. 1) of the device 103, or in an applications layer of device 103. In either case, the application 105 is provided with the required privileges to allow the application 105 to send and receive arbitrary IP frames. However, when the application 105 is not embedded in the OS of the gateway device 103 application 105 may not be able to access the so-called "privileged" portions of the network API of device 103 (not shown in FIG. 1) without "hacking" into the OS of the device 103. Such a device may be referred to as a "restricted" device or restricted smartphone.

One specific example of a network API is the Berkeley sockets (sometimes referred to as BSD Socket API). However, there are many others. In general, a network API can be thought of as a set of networking classes or libraries or so-called "socket" classes that are accessible to different programming languages. Regardless of the specific type of network API, almost all existing, network APIs are used to create and control Transmission Control Protocol (TCP) or User Datagram Protocol (UDP) connections, either directly or indirectly.

In more detail, when a smartphone (e.g., iPhone, Android, BlackBerry) or a similar device does not include a gateway application within its respective OS, and, instead, separates the gateway application from the OS the separated gateway application may not be able to operate effectively unless it is provided "root access" (i.e., provided access to the privileged portions of the API). When the gateway application is a third party, gateway application (e.g., an application that is not typically provided by the smartphone manufacturer) root access is routinely unavailable. As a result, third party gateway applications that are otherwise capable of making TCP or UDP connections are not able to send or receive IP frames directly because they are not provided root access. Thus, if a third party gateway application attempts to invoke the privileged portions of a restricted smartphones network API, access will be denied and the invocation will fail. In sum, the lack of root access means that a restricted gateway device will not be able to connect a client device to the Internet. The lack of root access also means that it is not possible to implement a Dynamic Host Configuration Protocol (DHCP) service on a restricted gateway device. Still further, without root access, it is not practically possible to operate or use a restricted gateway device as a Wi-Fi router.

Other methods of providing Internet access are also unsatisfactory when such access is attempted through a restricted device. For example, so-called "proxy" servers (e.g., a SOCKS proxy or HTTP proxy) provided within a gateway device may be used to detect TCP connections from a client device and then map the detected connections to new TCP connections originating from the gateway device. Compared to other methods, proxy servers operate at the application layer and only need TCP access. Therefore, this second solution does not require privileges from a restricted system.

However, there are two drawbacks to using proxy servers. First, the client device needs to have the capability of establishing a TCP connection with the gateway device over an existing TCP/IP network. Unfortunately, this may not always be possible because, for example, many times the client device and gateway device can only communicate with each other using a USB or Bluetooth connection, i.e., there is no means for establishing a direct Internet/subnet connection between the two. Yet another disadvantage is that most network applications do not support connections made by proxy servers. Still further, even if such connections are supported, each connection needs to be individually customized, which is a significant disadvantage compared with other methods.

The inability to obtain root access and prohibition against implementing a DHCP service place undesired limitations on the development, implementation and growth of third party gateway applications, which could otherwise operate on a smartphone, to the detriment of smartphone users whose devices are so restricted. Realizing this, and the additional inability to effectively use proxy servers, the present inventors realized that solutions were needed to overcome the limitations of restricted devices.

To allow restricted devices such as smartphones to run third-party applications, the present disclosure provides innovative techniques to implement third party, gateway applications on restricted devices.

As used herein the terms "application" and "platform" (e.g., gateway application, gateway platform, client application, client platform) will be used as synonyms. Further, it should be understood that an application or platform may comprise hardware, firmware, software or some combination of the three that are made a part of one or more elements of a device (e.g., memories, processors, and/or some combination of memories and processors) capable of storing and executing instructions used to control the operation of a gateway or client device. Still further, it should be understood that an application or platform may also include those components or technologies typically used to create Internet connections between a client device and the Internet (e.g., device driver to name just one example).

Though typically used in the singular, it should be understood the terms "gateway device" may include a plurality of devices that include one or more elements implementing gateway functions used to connect a client device to the Internet.

Figure 2A:
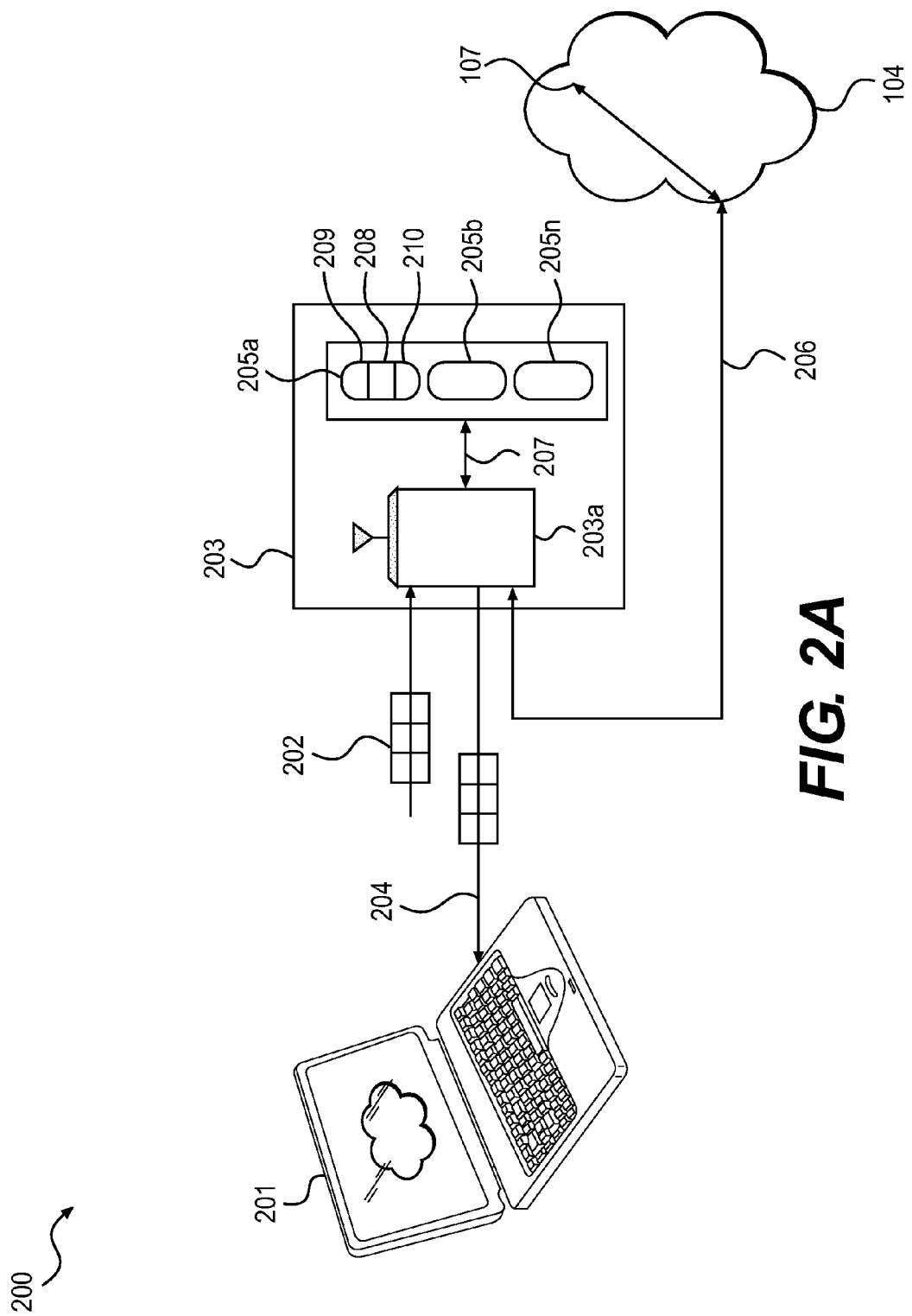
FIG. 2A shows an embodiment of a novel network including a client device operable to seek access to the Internet via an intermediate, or gateway device.

Referring now to FIG. 2A, to address the shortcomings associated with existing solutions that prevent a third party, gateway application or platform (referred to as "gateway platform" hereafter) running on a restricted device from accessing privileged portions of a network API or otherwise obtaining root access privileges and the like, the present disclosure provides for a system 200 that includes a device 203 operable to perform gateway functions, in particular, Internet gateway functions. The device 203 may comprise a transceiver section 203a for receiving one or more outgoing IP frames 202 generated by a client device 201 (or another type of source device), and one or more memories 205a-n, where at least one of the memories 205a comprises stored instructions for implementing at least one gateway platform 208, a network API 209 and OS 210.

Figure 2B:
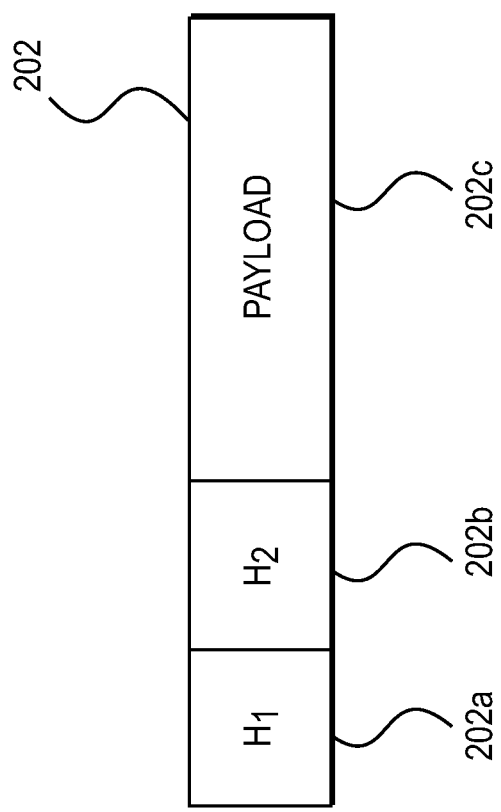
FIG. 2B shows an embodiment of an outgoing IP frame transmitted by the client device of FIG. 2A.

In one embodiment, the outgoing frame 202 may comprise a few sections. Referring now to FIG. 2B there is shown a simplified view of the IP frame 202. As shown, frame 202 comprises a first header section 202a, a second header section 202b and a payload section 202c. As is understood by those skilled in the art, when the second header section 202b comprises a TCP header, the second header section 202b may include one or more "flags", such as a SYN flag, ACK flag, SYN/ACK flag, FIN flag or RST flag to give a few examples. The meaning of each flag is governed by well-known TCP/IP protocol specifications and standards and, thus, need not be discussed herein in any great detail.

As is further understood by those skilled in the art, when the second header section 202b comprises a TCP header section the second header section 202b may include a destination port of a destination server or other device. Further, the first header section 202a may include an IP address of the destination server. Similarly, when the second header section 202b is a UDP header, the section 202b may include a UDP port and the first header section 202a may include a destination address.

Figure 2C:
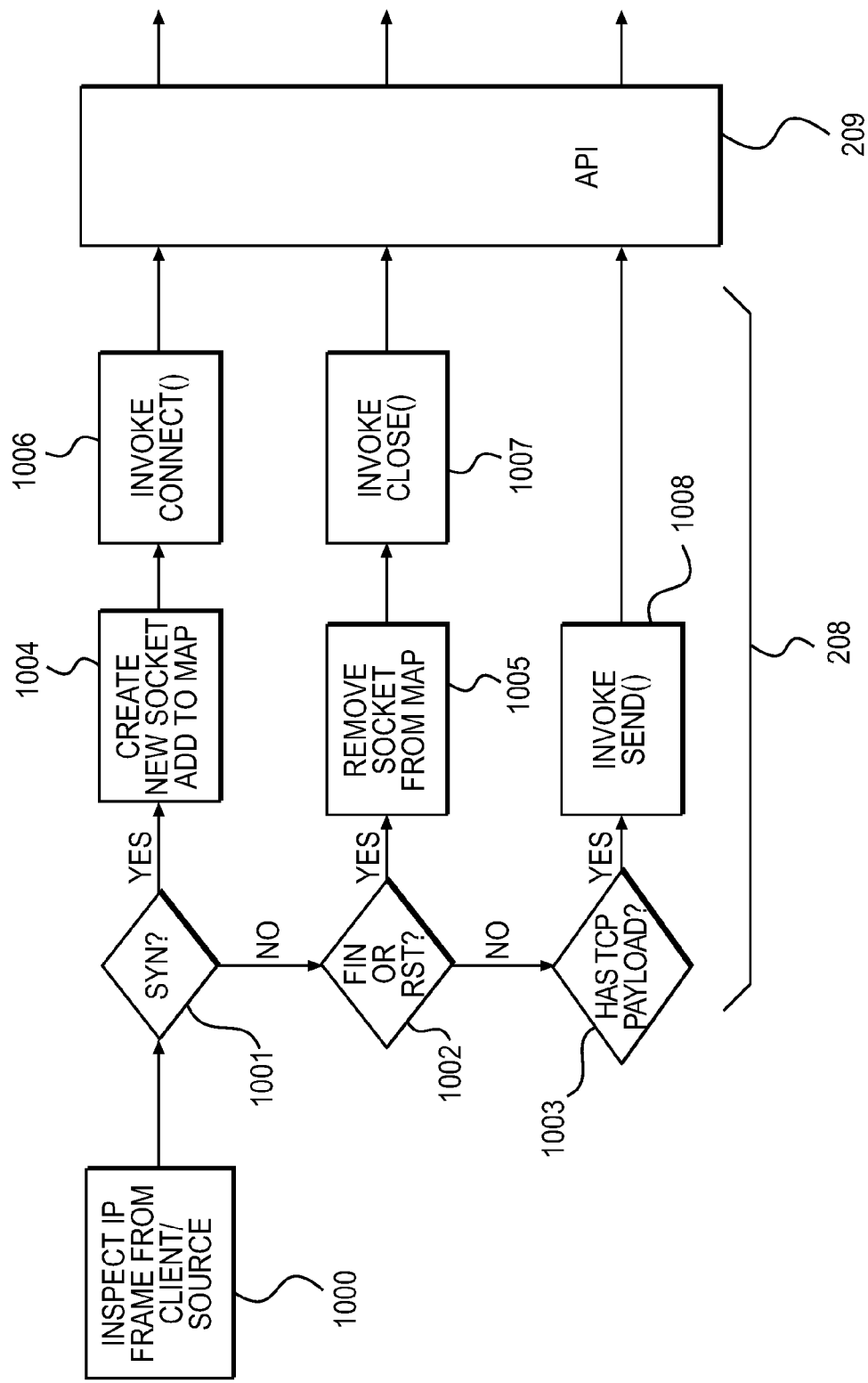
FIG. 2C illustrates the operation of a gateway platform of the gateway device shown in FIG. 2A.

FIG. 2C depicts a simplified, exemplary diagram illustrating the operation of platform 208 upon receiving an outgoing IP frame 202. After at least one outgoing frame 202 is received by the transceiver section 203a and forwarded on to the memory 205a, the platform 208 may inspect the at least one outgoing IP frame 202 to determine the type of each IP frame that has been received (step 1000). In one embodiment, the platform 208 may determine that the second header section 202b of a given IP frame 202 is a TCP header. The platform 208 may be further operable to detect the type of flag that is included within the TCP header (steps 1001 and 1002), the destination port within the TCP header and the IP address of a destination server within the first header section 202a. The platform 208 may be further operable to detect the payload section 202c as well (step 1003). Depending on the type of IP frame (TCP or UDP for example), the type of flag detected (again, using a TCP header as an example), and whether or not the frame 202 has a payload, the platform 208 may be further operable to generate one or more invocations or "calls" (steps 1006, 1007, and 1008) that are forwarded to particular, non-privileged portions of the API 209. This process of determining the type of IP frame, and its flag is sometimes referred to as "unwrapping" an IP frame.

In sum, after determining the type of IP frame (e.g., TCP or UDP) and flag, if applicable, the platform 208 may generate and forward one or more invocations or calls to particular, non-privileged portions of the network API 209.

For example, if the platform 208 determines that the second header section 202b comprises a TCP header and the header 202b includes a SYN flag (step 1001), the platform 208 may be operable to create a new socket and add the socket to a socket map structure (step 1004), and generate one or more invocations or calls (step 1006) that are forwarded to particular, non-privileged portions of the network API 209 responsible for creating a new TCP connection between the gateway device 203 and a destination server, or other device associated with the destination address within the first header section 202a, and destination port within second header section 202b. By so establishing a new TCP connection through the API 209, the limitations of prior systems and techniques are overcome. Because the platform 208 and device 203 act as a gateway to provide Internet access to the client device 201 they may fittingly be referred to as a gateway platform 208 and gateway device 203, respectively.

Alternatively, if the platform 208 determines that the type of flag within the frame 202 is a FIN or RST flag (step 1002), then platform 208 may be operable to remove the respective socket from the socket map (step 1005) and generate and forward one or more invocations or calls (step 1007) to particular, non-privileged portions of the network API 209 responsible for terminating or resetting a TCP connection between the gateway device 203 and a destination device associated with the destination address and destination port. The API 209 may then terminate or reset the TCP connection.

Yet further, when the type of flag within frame 202 is determined to be a SYN/ACK flag by the platform 208 (step 1003), the platform 208 may be operable to generate and forward one or more invocations or calls (step 1008) to particular, non-privileged portions of the network API 209 responsible for forwarding the contents of the payload section 202c over an existing TCP connection. The API can then forward the payload to the appropriate destination.

Before going further, it should be understood that as used herein, the phrase "IP frame" may mean either a complete IP frame or a portion thereof (i.e., a portion and/or data derived from a complete IP frame).

It should be understood that each of the memories 205a-n are operable to communicate with each other. Further, the platform 208, network API 209, and OS 210 are also operable to communicate with one another (i.e., normally OS 210 implements and exposes the network API 209). The communications occur, for example, over pathways (not shown for the sake of clarity) between memories 205a-n and between the platform 208, network API 209 and OS 210. It should be understood that such pathways are known in the art and their depiction is not necessary for an understanding of the present disclosure.

In alternative embodiments, the client device 201 may be a laptop or desktop computer or another type of device that requires Internet access, while the device 203 may be a smartphone that supports BSD Sockets or other interfaces (e.g., network class libraries) or another type of device that has the capability of providing Internet access.

In accordance with an additional embodiment, the platform 208 may be operable to determine that the second header section 202b comprises a UDP frame header indicating that the outgoing IP frame is formatted as a UDP frame. Further, the platform 208 may be operable to detect the destination address within the first header section 202a, the UDP port within the second header section 202b and the payload within section 202c. Thereafter, the platform 208 may be operable to generate and forward one or more invocations to particular portions of the network API 209 responsible for forwarding contents of the payload section 202c to a destination specified by the destination address and port within the outgoing IP frame 202.

More particularly, in an alternative embodiment, when the port within the second header section 202b is associated with a Domain Name System (DNS) port (e.g., port 53) and the payload section 202c comprises a DNS query the platform 208 may be further operable to generate and forward invocations to particular portions of the network API 209 responsible for completing an Internet domain name look-up.

Figure 2D:
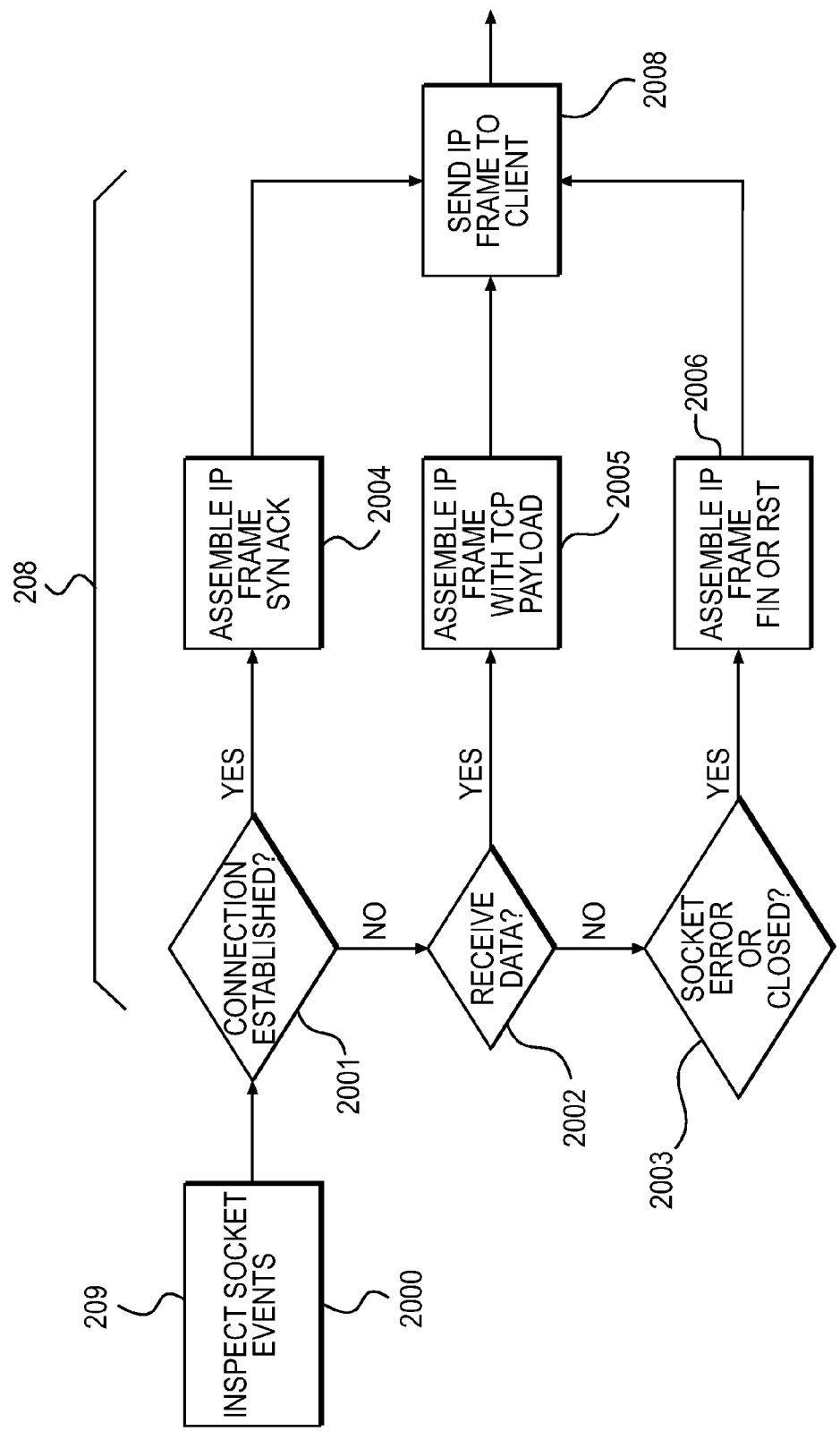
FIG. 2D illustrates the operation of gateway platform in response to incoming network events, according to an embodiment.

In the opposite or incoming direction, device 203 is operable to monitor socket or network events (hereafter referred to as "network events") or incoming data 206. FIG. 2D depicts a simplified, exemplary diagram illustrating the operation of platform 208 in response to incoming network events.

Because the platform 208 has no way of directly monitoring the occurrence of a network event (e.g., establishment of a TCP connection, termination of an existing connection or the transfer of data over an existing connection, to name a few examples), it must rely on another element or elements within device 203 for notification of a network event.

In more detail, in accordance with an embodiment, the platform 208 may be operable to periodically generate one or more invocations or calls to particular non-privileged portions of the network API 209 responsible for monitoring network events (step 2000). As a result of such periodic invocations, upon the occurrence of a network event the network API 209 is operable to provide the platform 208 with a notification of a network event and the type of event (steps 2001, 2002, and 2003). It should be understood that the transceiver section 203a may also be involved in the detection and monitoring of network events. It should be further understood that a network event may be associated with incoming TCP/IP frames and any address information, port information, flags and payload, for example, within such frames.

After receiving a notification of an incoming network event, the platform 208 may be operable to assemble a new IP frame (steps 2004, 2005, 2006) based on the type of network event that has occurred. The newly assembled IP frame may be forwarded to the transceiver section 203a (step 2008). Thereafter, the transceiver section 203a may be operable to transmit or forward (collectively referred to as "forward") the newly assembled IP frame 204 to the client device 201. Upon receiving the newly assembled IP frame the client device 201 may be operable to use the received frame to help establish a new TCP connection, or acknowledge the termination of an existing connection or transfer data over an existing connection, to name just a few examples, depending on the type of frame assembled by the platform 208 and then received by the client device 201.

In more detail, in one embodiment the platform 208 may be operable to assemble a new IP frame that contains an appropriate flag (e.g., SYN/ACK flag) (step 2004) upon occurrence of the establishment of a new TCP connection 206 between the device 203 and a destination device after receiving notification from the network API 209 that such an event has taken place (step 2001). The newly assembled IP frame 204 may then be forwarded on to the client device 201 via the transceiver section 203a as explained above, or by other means (step 2008).

Though the complete details of how the device 203 and a destination device, such as device 107 in FIG. 2A, establish a TCP connection are unnecessary for an understanding of the present disclosure, those skilled in the art will readily recognize that such a connection includes a separate "handshake" (e.g., set of exchanges) between the OS 210 and host device 107.

So far we have discussed the occurrence of a new, TCP connection. In accordance with another embodiment, if (or once) a TCP connection is established, payloads (e.g., content, data) and the like may be transferred over an established TCP connection. In one such alternative embodiment, in response to a periodic invocation from the platform 208 the network API 209 is further operable to provide a notification to the platform 208 of the arrival of an incoming payload on connection 206 (step 2002). Thereafter, the platform 208 is further operable to assemble at least one new IP frame containing the incoming payload (step 2005) and forward the newly assembled IP frame 204 to the client device 201 via the transceiver section 203a (step 2008).

It should be understood that the platform 208 may be operable to complete a TCP/IP frame "wrapping" process which is opposite to the unwrapping process described above to assemble a new IP frame. Further, though the complete details of how a payload or its content is transferred over an existing TCP connection between the device 203 and device 107, for example, to client device 201 are unnecessary for an understanding of the present disclosure, those skilled in the art will readily recognize that a transfer of a payload between device 203 and device 107 also includes the completion of a "handshake" between the OS 210 and device 107.

Having discussed two types of network events (i.e., the establishment of a new TCP connection and the transfer of content in a payload) and how they may be handled by an exemplary gateway platform 208, we now turn our attention to a third type of network event, namely, the termination of an existing TCP connection.

Still referring to FIG. 2D, in accordance with an embodiment, a network termination event 206 (e.g., socket error or closing of a socket) may occur, upon which the network API 209 is operable to so notify the platform 208 in response to a periodic invocation from the platform 208 (step 2003). Thereafter, the platform 208 may be operable to assemble a new IP frame containing a FIN flag or an RST flag (step 2006). The so assembled IP frame is then forwarded to the client device 201 via the transceiver section 203a or another means (step 2008).

Though the complete details of how a TCP connection may be terminated are unnecessary for an understanding of the present disclosure, those skilled in the art will readily recognize that such a termination includes a separate "handshake" between the OS 210 and a source device (i.e., device that initiated the termination).

In our discussion above the outgoing or incoming IP frames 202 and 204 need not necessarily originate at the client device 201. That said, in accordance with alternative embodiments, when a client device, such as client device 201, generates an IP frame it may be intercepted and forwarded on to the gateway device 203.

More specifically, in accordance with alternative embodiments, elements within the client device 201 may be operable to intercept an outgoing IP frame and then forward the intercepted frame on to the device 203. Upon receiving the intercepted frame the device 203 may operate similar to the discussion above. As used herein, "intercepted" means at least that an IP frame is first passed through a client gateway platform described below.

In more detail, almost all applications and platforms running on a computer or another type of client/source device rely on TCP or UDP Internet connections. In some situations there is no ready access to the Internet. Without access to the Internet an application running on a computer or the like will not function properly. In accordance with a further embodiment, even if Internet access is not readily available through typical means (wired/wireless routers, modems) Internet access can nonetheless be established, for example, using an available smartphone and computer configured to complete the exemplary features and functions described above and below.

For example, in accordance with one embodiment, when a computer or other client device desires to establish an Internet connection (e.g., using TCP) one or more outgoing IP frames may be intercepted in order to ensure that each IP frame is forwarded to, and received by, a gateway device (e.g., smartphone).

Figure 3:
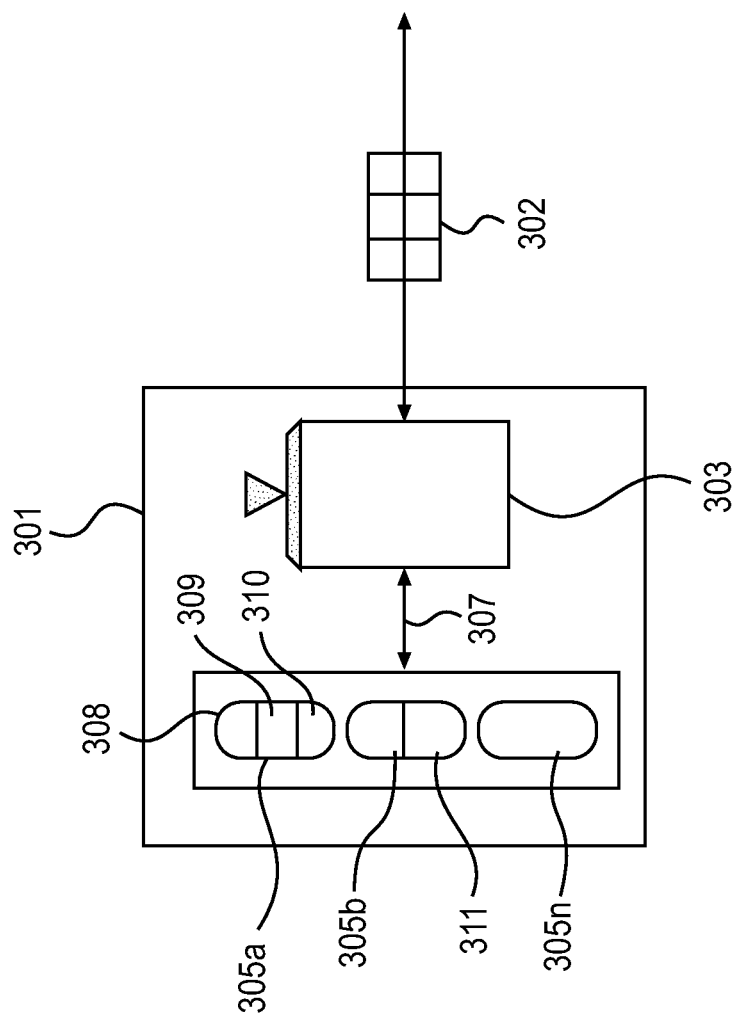
FIG. 3 shows an embodiment of a client device operable to seek access to the Internet.

Referring now to FIG. 3, there is shown an example of a client device 301 in accordance with an embodiment. As shown, the device 301 comprises a transceiver section 303 and one or more memories 305a-n, where at least one of the memories 305a comprises stored instructions for implementing a client gateway platform 308 for, among other things, intercepting an outgoing frame. In alternative embodiments, the platform 308 may comprise a virtual Ethernet driver or virtual modem driver. In addition, at least one of the other memories 305b comprises stored instructions for implementing at least one network application platform 311. The memory 305a may additionally comprise stored instructions for implementing a client side API 309 and OS 310 all of which are operable to communicate with each other. The network application platform 311 may comprise a web browser and/or email application to name just a few examples. It should be understood that similar to the memories 205a-n in FIG. 2, memories 305a-n may comprise one or more memories, processors or some combination of memories and processors. Though not shown in FIG. 3, it should be understood that the client device 301 further comprises all of the elements (e.g., electronics, software and firmware) required to operate and complete the features and functions of a client device. For ease of understanding, to the extent that many of these elements are commonly known they are not shown in FIG. 3 or discussed herein.

Continuing, if device 301 needs to establish an Internet connection then in accordance with one embodiment, an IP frame containing an appropriate flag and the IP address and TCP port number of a destination device/application (e.g., device 107 in FIG. 2A) may be generated by the network application platform 311 and/or OS 310. Thereafter, the frame 302 is intercepted or otherwise received by the client gateway platform 308 and then forwarded to the device 203, in particular, to the third party platform 208. Upon receiving the frame 302, the platform 208 proceeds to operate as described above and as illustrated in FIG. 2C.

In more detail, in accordance with an embodiment, the platform 308 may be operable to "unwrap" Ethernet frames or PPP frames from the OS 310 or network application platform 311 in order to extract IP frames. In some embodiments, the unwrapping and extraction of IP frames may be completed by client gateway platform 308 or platform 208 residing on device 203.

In a further embodiment, to ensure that an intercepted frame is correctly received by the device 203 the client transceiver 303 is operable to forward the intercepted frame to the device 203 on one or more specific channels or otherwise encode the frame on a channel using any number of methods in order to identify the frame as intercepted frame. Similarly, the transceiver section 203a in the device 203 is operable to receive the intercepted frames (e.g., the outgoing IP frame mentioned earlier) on the one or more specific channels, or on some channel associated with such specific channels, or on the encoded channel (collectively referred to as one or more "designated" channels") in order to properly receive the intercepted frame prior to forwarding the frame to the platform 208.

Using the interception features of the client device 301, in conjunction with the features of device 203, it can be seen that many of the limitations placed on restricted systems are substantially eliminated. Instead of rejecting frames, all, or substantially all, frames may be accepted by first intercepting the frames and then forwarding the frames on to platform 208, which communicates with particular, non-privileged portions of the network API 209 to effectively bypass many restriction functions.

It should be understood that the platforms 208 and 308 are "transparent" to any network application, such as application 311, running on a client device or another similar device. That is, a network application platform will not be aware of the existence of a gateway platform and will have full access to the Internet. Yet further, it should be understood that from an Internet service provider's vantage point, a TCP connection created by a client device in accordance with the present disclosure will look very similar to ones initiated from a smartphone because gateway platforms operating in accordance with principles of the present disclosure create TCP connections that look similar to those typically created by a smartphone even though the TCP connections are created differently using the techniques discussed herein.

Though the discussion above focuses on the use of a platform functioning to intercept frames within the client device 301, in alternative embodiments, such a platform may not be necessary. Instead, a Bluetooth, dial-up networking (DUN), local area network or Wi-Fi connection may be established between a client device and gateway device. More specifically, in alternative embodiments, the client device 201 or 301 may be operable to forward an outgoing frame to the device 203 over a Bluetooth connection, Wi-Fi connection, USB and/or local area network connection. On the other end, the platform 208 may be operable to receive the frames formatted, for example, as Bluetooth or Ethernet frames over a Bluetooth or Wi-Fi connection without the need, for example, to initially intercept the frames.

II. Wi-Fi Internet Gateway System

According to another aspect of the disclosure, novel solutions are provided for building a Wireless Internet gateway system through a Wi-Fi capable device that also has Internet access provisioned by a cell phone carrier. Such solutions enable a Wi-Fi Internet gateway system to be implemented on a device where it was originally impossible to do so, due to various access restrictions to core functionalities (e.g., no root access).

Figure 4:
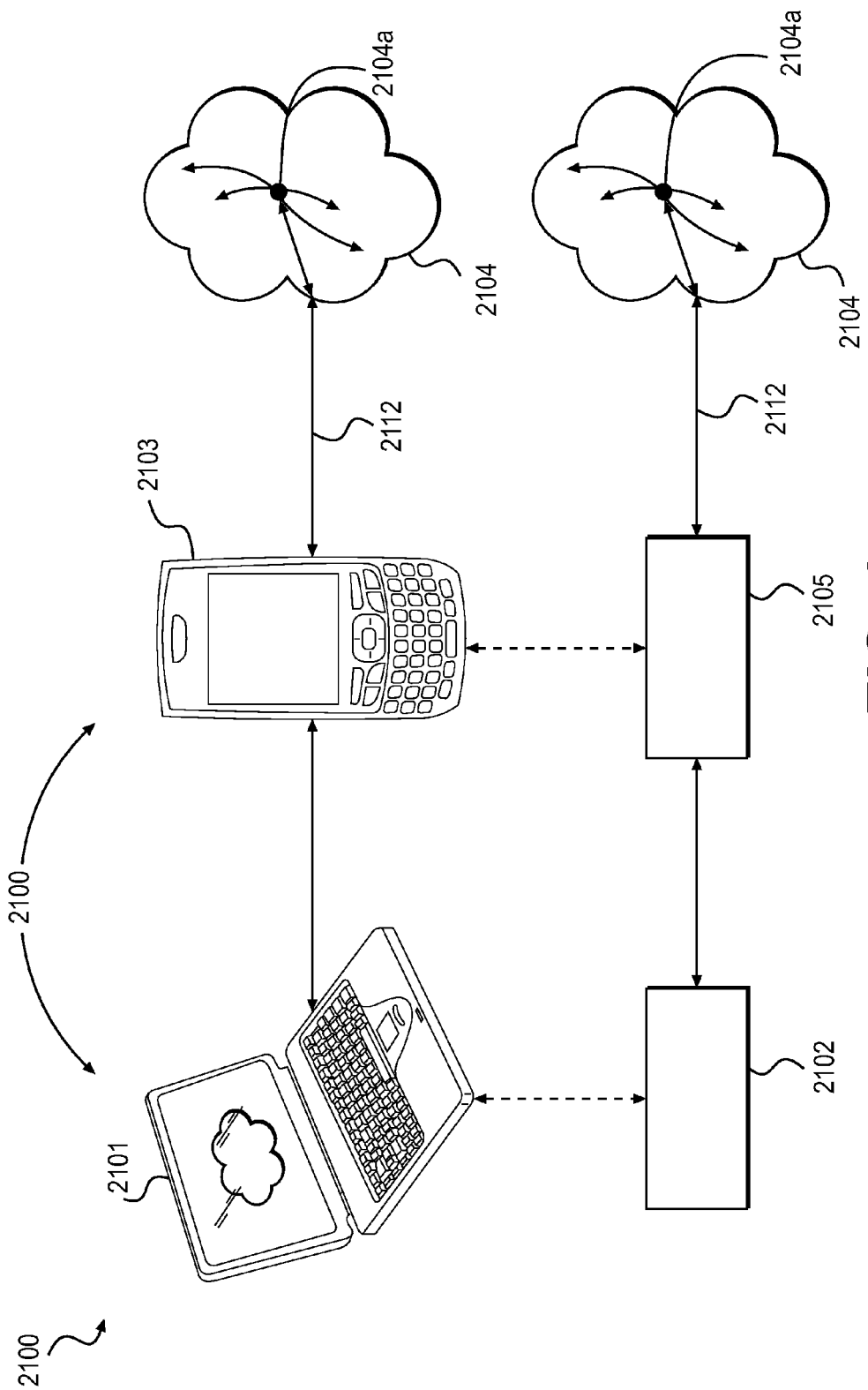
FIG. 4 shows a diagram of a traditional Wi-Fi router system.

Referring now to FIG. 4, there is shown a simplified block diagram of a traditional Wi-Fi router system 2100. As shown, the system 2100 comprises a client device 2101, which is seeking Internet Access, with or without help from client platform 2102, and a gateway device 2103, which is connected to the Internet 2104 through a cell phone data service 2112, and comprises a gateway platform 2105 to share said Internet access with the client device 2101. As indicated in FIG. 4, the client device 2101 is capable of establishing a Wi-Fi connection with the gateway device 2103. The client device 2101 and gateway device 2103 may include components (e.g., transceiver and memories) that are similar to the components of the client devices and gateway devices described in Section I of this disclosure. Also shown is a secondary web server 2104a.

In general, a traditional Wi-Fi router system works as follows. Some existing smartphones (e.g., gateway device 2103) include built-in features that allow them to act as a so-call "Wi-Fi Hotspot" or "Wi-Fi Tether".

When the Wi-Fi Tether feature is turned on within the gateway device 2103, the gateway platform 2105 is operable to communicate with a Wi-Fi adapter (not shown) in the gateway device 2103 to broadcast a Wi-Fi signal in order to create a Wi-Fi network (hotspot). In most cases, the Wi-Fi network is in an ad-hoc mode, however some rare adapters may also support an access point mode. Provided that the client device 2101 is within range of the Wi-Fi signal, the device 2101 will be able to receive, "discover" and connect to the Wi-Fi network using a "handshake" sequence. Once the handshake sequence and an authentication sequence are completed between the client device 2101 and gateway device 2103, a Wireless LAN (Local Area Network) connection is established (both the Physical Layer and the Data Link Layer as they are referred to in the OSI network model).

As soon as the Wi-Fi LAN (WLAN) connection is established, any other device within range of the Wi-Fi signal or already a part of the WLAN may send Ethernet frames. More specifically, typically both the client device 2101 and the gateway device 2103 will broadcast DHCP discovery packets to other devices in the Wi-Fi network in order to form a subnet so that they know whether they can route IP packets over the Wi-Fi network and how to do so.

In order to function as a Wi-Fi router, the gateway device 2103 must include the necessary hardware, software and firmware to implement a DHCP server. Once the gateway device 2103 functions as a DHCP server, it will be able to listen for DHCP request packets from the client device 2101 and assign a configuration to the client device 2101 in a DHCP response which, for example, specifies the client's IP address, subnet mask and the gateway IP address pointing to the gateway device itself 2103. This process prepares the TCP/IP stack on the client device 2101 such that all outgoing IP packets on the client device 2101 will automatically be routed to the gateway device 2103. The gateway device 2103 may then forward IP packets from the client device to its own Internet service (and vice versa for incoming IP packets). The gateway platform 2105 may further perform Network Address Translation (NAT) to, for example, map an internal source IP/port with an external IP/port before forwarding the IP packets.

In order for the Wi-Fi routing architecture just discussed above to work, the gateway platform 2105 needs to be granted the appropriate privileges in order to send/receive IP packets. Such a capability is necessary in order to implement a DHCP server to begin with (even though DHCP uses UDP as a communication protocol, it still needs to construct raw IP frames in the response). When the gateway platform 2105 is a part of the OS kernel of the gateway device 2103, or, when the platform 2105 is a part of the application layer, the gateway application 2105 has the needed privileges to send/receive arbitrary IP frames through an API. However, when the gateway device 2103 is a part of a restricted device, third-party applications are not granted such privileges. Without such privileges, it is impractical to implement a DHCP server or a traditional Wi-Fi Internet gateway using a third-party application.

Furthermore, some existing restricted devices place restrictions on which third-party applications can be installed (e.g. they are not approved by the smartphone manufacturer). As a result, if an Internet gateway application (e.g., platform 2105) is not approved users will not be able to make use of the platform. This makes it difficult for end users to implement gateways, DHCP servers and other capabilities on their smartphones and the like using a third-party application.

Realizing that a DHCP server cannot be implemented on traditional restricted devices using third-party applications or platforms, in one embodiment, a DHCP server is implemented on a client device. Thus, such an embodiment swaps the traditional roles of the gateway device and client device in order to form a Wi-Fi subnet. In accordance with an embodiment, the client platform functions as a DHCP server to create a private subnet with a gateway device (e.g., smartphone) instead of the other way around. This subnet is only used to allow the client device and gateway device to communicate and transfer IP packets. The gateway device is still responsible for forwarding IP packets to the Internet.

In additional embodiments, a Wi-Fi Internet gateway system is created for devices that do not even allow native applications to be installed. For example, a gateway platform is deployed into a web application that can be loaded into a smartphone's browser. Coupled with the technique above, this feature permits packets to be forwarded to a secondary gateway server which forwards them on to the Internet. In more detail, using the above-mentioned combination of features, IP packets may be sent from a client device to a web browser on the gateway device, then on to the second gateway server, and finally to the Internet (or vice versa).

As is previously alluded to, one of the most common ways to implement an Internet gateway on a smartphone is to convert the phone into a Wi-Fi Hotspot. The gateway device or smartphone can be set up to broadcast a Wi-Fi access point or ad-hoc network so that a client device with Wi-Fi access can connect to it. The phone itself will also function as a DHCP server which will lease a private IP address as well as other subnet settings to the client device. All Internet traffic/IP packets may then be routed to the smartphone. The smartphone will read/write IP packets (wrapped in Ethernet frames) through a Wi-Fi adapter (e.g., interface) and forward them onto the cell phone's data service carrier/network, thus making the smartphone a Wi-Fi router. Problems arise, however, when, as discussed above, the smartphone or other device, even though it supports Wi-Fi and has Internet access, does not have an Internet routing platform built-in as part of its OS. Such an Internet routing platform can be supplied by third-party developers, provided, the smartphone allows root access. Unfortunately, many smartphones do not allow root access, thereby making it difficult to use available Internet routing platforms.

Figure 5:
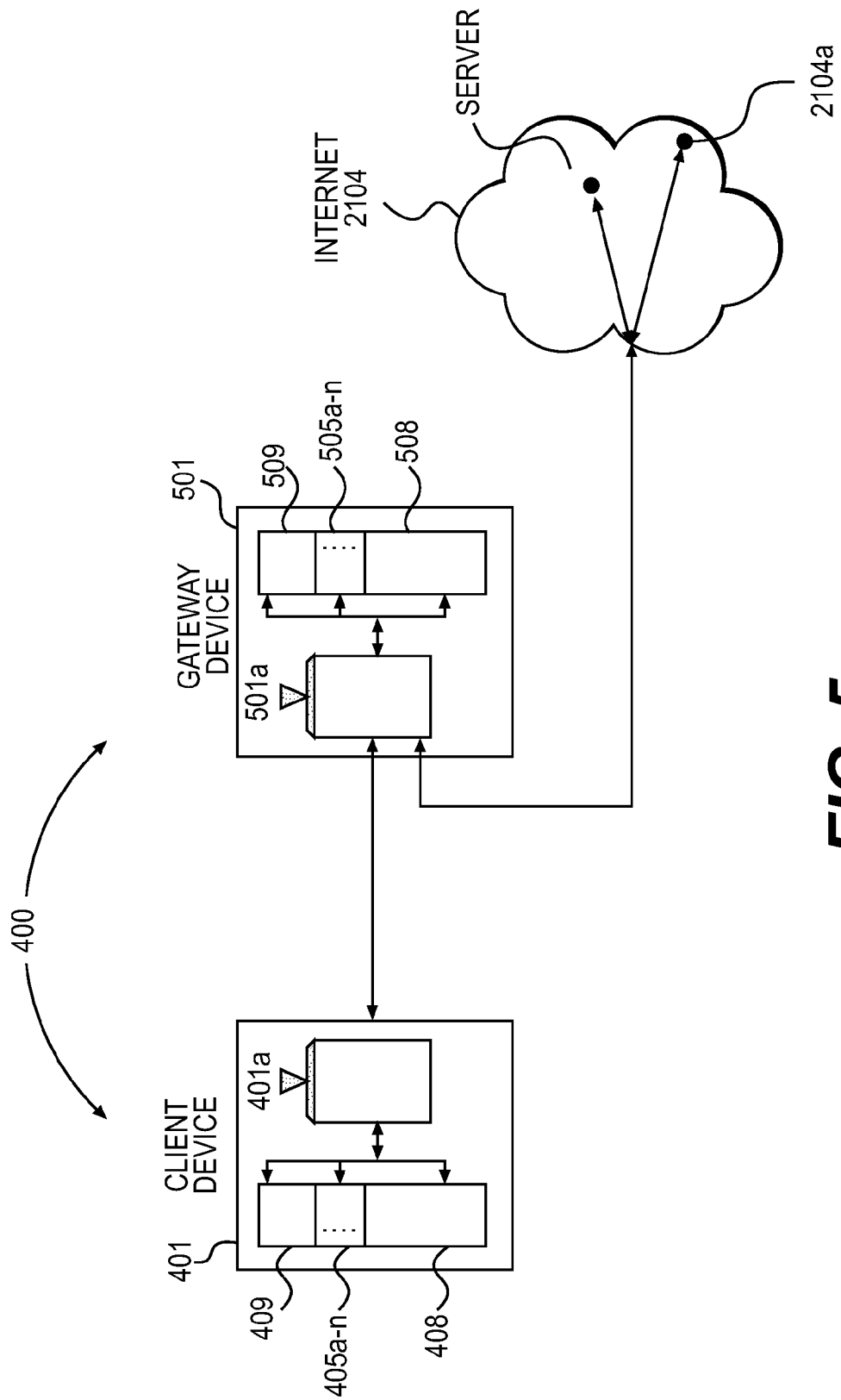
FIG. 5 shows an embodiment of a novel Wi-Fi router system.

Turning to FIG. 5, in order to overcome the problems associated with restricted devices, in one embodiment, a novel Wi-Fi router system 400 is provided. The system 400 includes a client device 401 and a gateway device 501 which is connected to the Internet 2104. In alternative embodiments, the client device 401 may be a laptop or desktop computer or another type of device that requires Internet access, while the gateway device 501 may be a smartphone that supports BSD Sockets or other interfaces (e.g., network class libraries) or another type of device that has the capability of providing Internet access. The client device 401 can include a novel client platform 408 in communication with a network API 409 of the client device 401, and a transceiver section 401a for transmitting and receiving IP packets. The gateway device 501 can include a novel gateway platform 508 in communication with a network API 509 of the gateway device 501, and a transceiver section 501a for transmitting and receiving IP packets. The client device 401 and gateway device 501 include components that are not found in traditional client devices and gateway devices. Namely, the client platform 408 and gateway platform 508 enable the client device 401 and gateway device 501 to work around the restrictions posed by restricted devices.

It should be understood that the client platform 408 and gateway platform 508 may comprise hardware, software or firmware implemented as stored instructions on one or more memories 405a-n and 505a-n, respectively, where at least one of the memories comprises stored instructions for implementing the features and functions of the respective client platform 408 and gateway platform 508 described above and below. As before, as used herein, the phrase memory may mean one or more memories, one or more processors or some combination of memories (storage devices) and processors. Further, as before, the phrase "IP frame" may mean either a complete IP frame or a portion thereof (i.e., a portion and/or data derived from a complete IP frame). Each of the memories 405a-n, 505a-n shown in FIG. 5 is operable to communicate with each other over, for example, pathways (not shown for the sake of clarity). It should be understood that such pathways are known in the art and their depiction is not necessary for an understanding of the present disclosure.

As we have noted before, a traditional Wi-Fi router is implemented on a gateway device (ad-hoc or access point type). Once a Wi-Fi network is created, a client device may connect to it. However, as we have explained above, smartphones without a Wi-Fi hotspot feature typically cannot create a Wi-Fi network (end user or application implemented). Such gateway devices only offer the ability to find and connect to an existing Wi-Fi network. To overcome this type of limitation, the client device 401 and associated client platform 408 function as a Wi-Fi hotspot by creating a Wi-Fi network.

Figure 6:
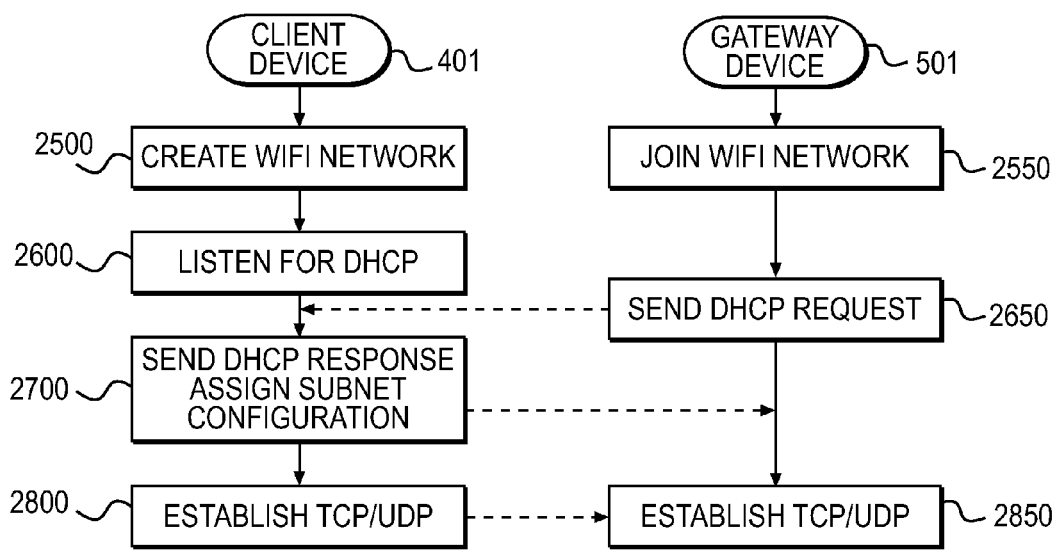
FIGS. 6 and 7 illustrate the operation of a client device and a gateway device in a novel Wi-Fi router system, according to exemplary embodiments.
Figure 7:
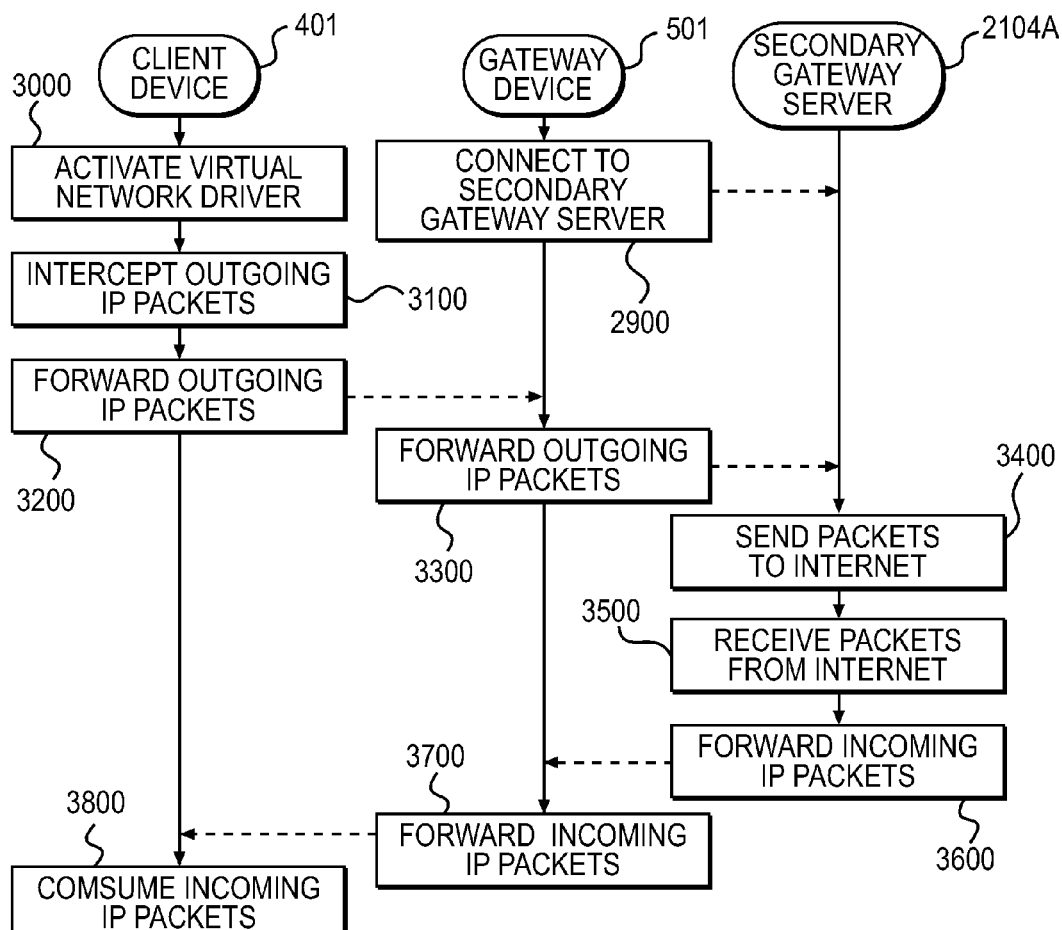

For example, referring now to FIGS. 6 and 7 in alternative embodiments, the novel client platform 408 is operable to create a Wi-Fi network so that a gateway device 501 can join such a network. Further, the client platform 408 may be operable to function as a DHCP server and bind to a Wi-Fi adapter on the client device in order to create a private subnet with the gateway device 501. Yet further, the client platform 408 may be further operable to install, include or function as a virtual Ethernet driver or a virtual modem driver in order to intercept outgoing Internet packets from upper TCP/IP stack on the client device's operating system, and also feed incoming Internet packets to the TCP/IP stack.

Continuing, with reference to the exemplary process shown in FIG. 6, because the smartphone 501 and the client device 401 may connect using Wi-Fi, a WLAN may be created by the client device 401 (step 2500) and joined by the smartphone 501 (step 2550). Because DHCP server functionality is required to provision an IP network layer and form a private subnet, and because this cannot be accomplished using the restricted smartphone 501, the present disclosure provides for the implementation of a DHCP server on the client device 401. In one embodiment, the client platform 408 is operable to function as a DHCP server. The DHCP server is "bound" to a Wi-Fi adapter and "leases" a private subnet to the smartphone 501 after the ad-hoc network is formed. Particularly, the client device 401 listens for a DHCP request (step 2600), the smartphone 501 sends a DHCP request (step 2650), and the client platform 408 sends a DHCP response and assigns a DHCP subnet configuration (step 2700) in response to the DHCP request. The subnet settings consist of the smartphone's private IP address, with the subnet gateway IP address being the client device's private IP address. Remembering that the smartphone 501 is also connected to the Internet 2104 (through the phone's data service) and also has a public IP address, when the smartphone 501 initiates a TCP connection to the client device's IP address, the TCP connection will be routed to through the Wi-Fi adapter/interface instead of the data service interface (e.g., 3G modem) provided by the phone service due to the subnet settings. In other words, the smartphone 501 now becomes multi-homed and can communicate with both the client device 401 and the Internet 2104 using TCP connections that are distinguishable by the IP address the smartphone 501 is trying to connect to. This is a desirable feature of an Internet gateway device. With the DHCP request and response phase completed and the IP network layer ready, the gateway device 501 and the client device 401 can now establish one or more TCP/UDP connections (steps 2800 and 2850) and communicate with each other over TCP or UDP.

In accordance with some embodiments, because we are not connecting to a traditional Wi-Fi hotspot, we can no longer establish a TCP/IP stack on the client device via a Wi-Fi adapter. Instead, as illustrated in FIG. 7, the client platform 408 may be operable to function as a virtual Ethernet driver in order to bind the OS's TCP/IP stack to it. Therefore, upon activating the virtual Ethernet driver (step 3000), the client platform 408 will be able to capture or intercept all outgoing IP frames (step 3100) and pass the intercepted outgoing IP frames to the gateway device 501 (step 3200) for processing, through a novel communication channel (discussed below). Additionally, the client platform is able to intercept incoming IP packets from the gateway device 501 (step 3800) for consumption by the client device 401.

So far we have focused on the functions of the client platform 408. We now turn to discuss novel functions of a gateway platform 508 (FIG. 5). As previously discussed, the gateway platform 508 is part of or operates in conjunction with a gateway device 501 and is in communication with an API 509 of the gateway device 501.

Implementing the above described client platform 408 permits a gateway platform 508 of the smartphone/gateway device 501 to receive all IP packets coming out of the client device 401. A traditional Wi-Fi router on a smartphone will be able to simply forward these IP packets to the phone's data service. But because a restricted phone 501 will not allow a third-party application to send/receive raw IP frames, a conventional gateway platform will not be able to forward IP packets. Accordingly, to overcome this limitation, in one embodiment illustrated by FIG. 7, the novel gateway platform 508 is operable to connect to secondary gateway server 2104a (step 2900) in order to make TCP connections and perform two-way communications (e.g., forward and receive IP packets). The secondary server 2104a can be, for example, a public server on the Internet. The gateway platform 508 is operable to function as a bridge between the client device 408 and the secondary gateway server 2104a, and relay network data back and forth (steps 3300 and 3700). The secondary gateway server 2104a is operable to perform Internet gateway functionalities, including sending outgoing IP packets from the client device 401 to the Internet (step 3400), receiving incoming IP packets from the Internet (step 3500) and forwarding incoming IP packets to the client device 401 (step 3700). Because the secondary gateway server 2104a is not restricted, it can simply use traditional technologies including NAT to perform Internet sharing.

The remaining part of our discussion will focus on the creation of a Wi-Fi Internet gateway system through a smartphone without the need to install a native third-party application on the smartphone.

All smartphone systems today can run third-party applications built by developers outside of the phone's vendor or associated cellphone carrier. However whether or not a specific application will be able to reach end users is a different story. Some mobile phone vendors or carriers have an approval process that will block certain type of applications from installing on the phone. In order to build an Internet gateway out of such a restricted system without relying on a native application, the inventors have discovered a solution that relies on web technologies. In one embodiment, a web platform runs in a web browser of a phone so that there will be no restrictions on where the contents come from.

In an alternative embodiment, the web platform may be part of, or work in conjunction with, the above-described gateway devices, client devices and their associated platforms discussed in sections I and II. The web platform may comprise hardware, software or firmware implemented as stored instructions on one or more memories for implementing the features and function of the gateway platform described above and below. As before, as used herein the phrase memory may mean one or more memories, one or more processors or some combination of memories (storage devices) and processors.

Figure 8:
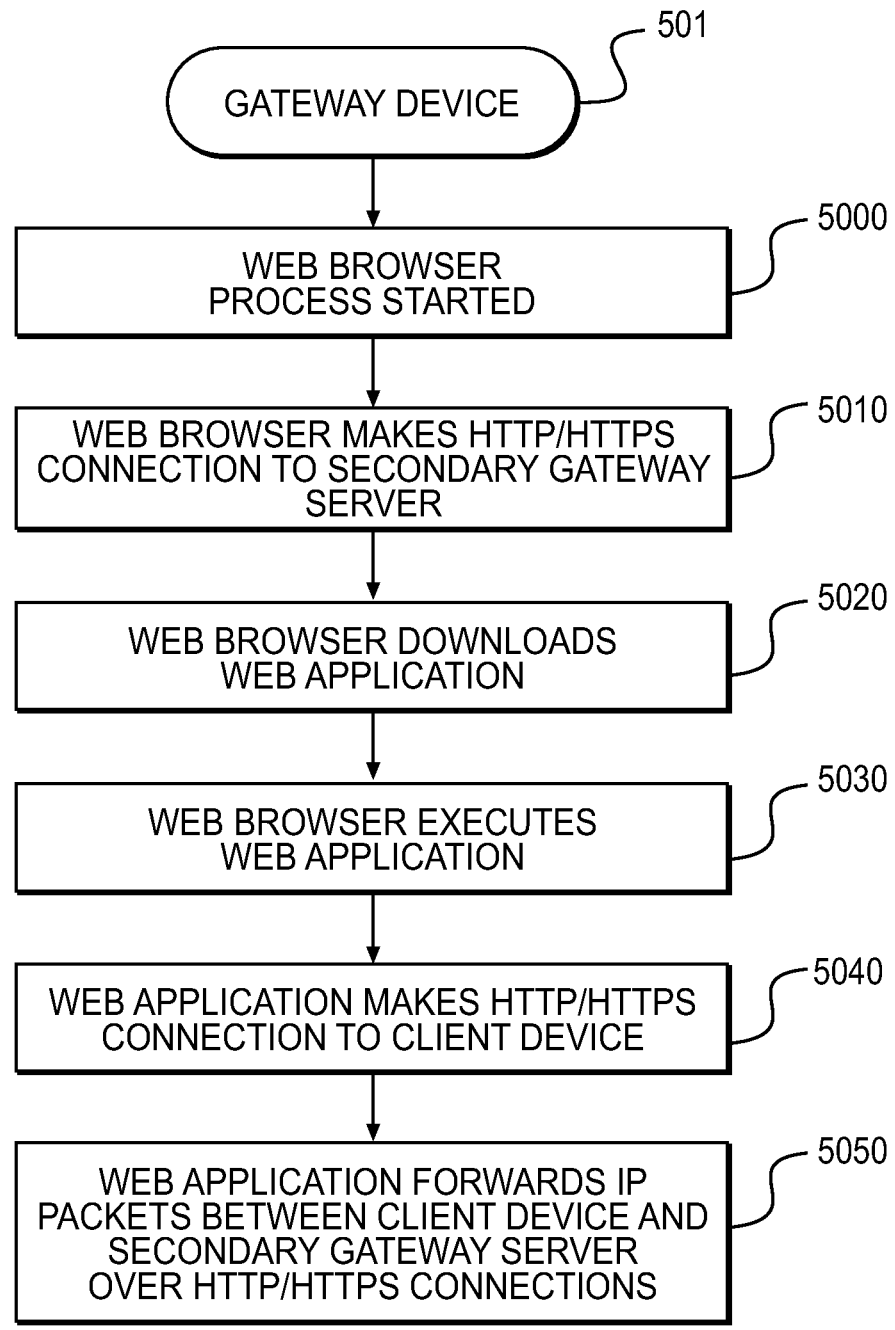
FIG. 8 shows the operation of a novel gateway device, according to an embodiment.

Backtracking somewhat, and referring to FIG. 8, after a private subnet is formed between the client device 401 and the gateway device 501, the web platform is initiated in order to start a web browser process (step 5000). In accordance with one embodiment, a web browser platform within the web platform may be operable execute scripts in conjunction with the gateway application to create a HTTP/HTTPS connection with the secondary gateway server 2104a (step 5010), and then download a gateway application which may consist of web pages and Javascripts from a designated web server (step 5020). The web browser platform may be further operable to execute scripts in conjunction with the gateway application to create a HTTP/HTTPS connection with the client device 401 (steps 5030 and 5040).

Because the gateway platform cannot make arbitrary TCP connections to random servers due to the "same-source" restriction on a web browser, when the gateway platform attempts to connect to the secondary gateway server 2104a it will have to be the same source as the web pages themselves. In most cases, this means that the same web server that serves the gateway platform will be used as the secondary gateway server 2104a.

In considering our earlier discussion, we know that a script needs to establish a communication channel between the client platform 408 and the gateway platform 508. Due to security restrictions, it is also known that a web page in a browser can only make outgoing connections. Therefore, when the gateway platform 508 is loaded or working in conjunction with the web browser platform, the gateway platform 508 can only initiate connection to the client platform 408 using HTTP or HTTPS. As a result, in one embodiment, the client platform 408 is operable to function as an HTTP server. This permits the gateway platform 508 to connect to the client platform 408 from "within" the web browser platform. Once such a connection is established, Internet packets can be passed through the gateway platform 508 to the gateway device 501 and on to the client device 401, and further between the gateway device 501 and the secondary gateway server 2104a, thereby enabling two-way transmission of IP packets between the client device 401 and the secondary gateway server 2104a (step 5050).

The end result is that the client device 401 now obtains Internet access through a Wi-Fi connection to a smartphone 501, which does not have any native gateway applications installed.

Both the client platform 408 and the gateway platform 508 may alternatively comprise device drivers, applications or even web contents.

When the web based gateway platform 508 initiates connections to the client device 401 or secondary gateway server 2104a, the connections may only be http or https connections. However, in alternative embodiments, depending on which web browser is running on the smartphone 501, there may be exceptions to what type of outgoing connections the gateway platform 508 can make. Modern web browsers on smartphones may have implemented HTML5 web sockets, or supports browser plug-ins such as Adobe Flash. In those cases, gateway platforms 508 may be operable to create and operate over regular Internet connections if they are allowed.

It is noted that, while the detailed description above describes various embodiments of information sharing technology between client and server devices, the inventive concepts described herein can be used to support sharing of other kinds of data besides Internet access.

It should be apparent that the foregoing describes only selected embodiments of the invention, and numerous changes and modifications may be made to the embodiments disclosed herein by one of ordinary skill in the art without departing from the general spirit and scope of the invention, as defined by the following claims and equivalents thereof.

What is claimed is:

1. A method of providing Internet access to a client device connected to a gateway device that is configured to establish an Internet connection, the method comprising:
   receiving, at the gateway device, at least one outgoing IP frame generated by a client device;
   determining a type of the at least one outgoing IP frame using a gateway platform of the gateway device, wherein the gateway platform is configured to access a network application programming interface of the gateway device that is configured to create and control TCP/UDP connections;
   generating, using the gateway platform, at least one invocation in response to receiving the at least one outgoing IP frame; and
   forwarding, using the gateway platform, the at least one invocation to particular, non-privileged portions of the network application programming interface.

2. The method of claim 1, wherein the header information comprises a TCP header, a SYN flag, a destination address and a destination port, and wherein the method comprises:
   operating the non-privileged portions of the network application programming interface, in response to receiving the at least one invocation, to create a new TCP connection between the gateway device and a destination device associated with the destination address and destination port.

3. The method of claim 1, wherein the header information comprises a TCP header, a FIN flag, a destination address and a destination port, and wherein the method comprises:
   operating the non-privileged portions of the network application programming interface, in response to receiving the at least one invocation, to terminate a TCP connection between the gateway device and a destination device associated with the destination address and destination port.

4. The method of claim 1, wherein the header information comprises a TCP header, a RST flag, a destination address and a destination port, and wherein the method comprises:
   operating the non-privileged portions of the network application programming interface, in response to receiving the at least one invocation, to terminate a TCP connection between the gateway device and a destination device associated with the destination address and destination port.

5. The method of claim 1, wherein the header information comprises a TCP header, a TCP payload section, a destination address and a destination port, and wherein the method comprises:
   operating the non-privileged portions of the network application programming interface, in response to receiving the at least one invocation, to forward contents of a TCP payload section of the IP frame over an existing TCP connection.

6. The method of claim 1, wherein the header information comprises a UDP header, a UDP payload section, a destination address and a destination port, and wherein the method comprises:
   operating the non-privileged portions of the network application programming interface, in response to receiving the at least one invocation, to forward contents of a UDP payload section of the IP frame to a destination specified by the destination address and destination port.

7. The method of claim 6, wherein:
the destination port is a DNS port;
the at least one outgoing IP frame includes a payload section comprising a DNS query; and
the non-privileged portions of the network application programming interface are configured to complete an Internet domain name look-up.

8. The method of claim 1, wherein the gateway platform is implemented by instructions stored on at least one memory device in the gateway device.

9. The method of claim 1, wherein the gateway device is a smartphone or a cellular phone.

10. The method of claim 9, wherein the client device is a desktop computer, a laptop computer, a tablet computer or a portable electronic device.

11. A gateway device configured to provide Internet access to a client device seeking Internet access through the gateway device, the gateway device comprising:
a transceiver configured to receive at least one outgoing IP frame generated by the client device;
a network application programming interface configured to create and control TCP or UDP connections; and
a gateway platform configured to access the network application programming interface,
determine a type of the at least one outgoing IP frame by detecting header information of the at least one outgoing IP frame,
generate at least one invocation based on the header information, and
forward the at least one invocation to particular, non-privileged portions of the network application programming interface.

12. The gateway device of claim 11, wherein:
the header information comprises a TCP header, a SYN flag, a destination address and a destination port; and
in response to receiving the at least one invocation, the non-privileged portions of the network application programming interface are configured to create a new TCP connection between the gateway device and a destination device associated with the destination address and destination port.

13. A computer program product comprising one or more computer-readable non-transitory storage media having stored thereon computer-executable instructions that, when executed by one or more processors of a computer system, cause the computer system to implement a method of providing Internet access to a client device connected to a gateway platform, the method comprising:
accessing, at the gateway platform, a network application programming interface configured to create and control TCP or UDP connections of a gateway device, wherein the gateway device is configured to provide Internet access to a client device seeking Internet access through the gateway device;
determining, by the gateway platform, a type of the at least one outgoing IP frame generated by the client device, by detecting header information of the at least one outgoing IP frame;
generating, by the gateway platform, at least one invocation based on the header information; and
forwarding, by the gateway platform, the at least one invocation to particular, non-privileged portions of the network application programming interface.

14. The computer program product of claim 13, wherein:
the header information comprises a TCP header, a SYN flag, a destination address and a destination port; and
in response to receiving the at least one invocation, the non-privileged portions of the network application programming interface are configured to create a new TCP connection between the gateway device and a destination device associated with the destination address and destination port.

* * * * *